United States Patent [19]

Dicke et al.

[11] Patent Number: 4,599,395

[45] Date of Patent: Jul. 8, 1986

[54] THERMOTROPIC, AROMATIC POLYESTERS HAVING GOOD MECHANICAL STRENGTH, CONTAINING SULFONIC ACID GROUPS OR METAL SULFONATE GROUPS A PROCESS FOR THE PRODUCTION THEREOF

[75] Inventors: Hans-Rudolf Dicke; Manfred Schmidt, both of Krefeld, Fed. Rep. of Germany; Mark Witman, Pittsburgh, Pa.; Aziz El-Sayed, Leverkusen, Fed. Rep. of Germany

[73] Assignee: Bayer Aktiengesellschaft, Leverkusen, Fed. Rep. of Germany

[21] Appl. No.: 659,160

[22] Filed: Oct. 9, 1984

[30] Foreign Application Priority Data

Oct. 25, 1983 [DE] Fed. Rep. of Germany ....... 3338623

[51] Int. Cl.$^4$ ............................................. C08G 63/68

[52] U.S. Cl. ................................... 528/173; 528/190; 528/193; 528/194

[58] Field of Search ................ 528/173, 190, 193, 194

[56] References Cited

U.S. PATENT DOCUMENTS

| | | | |
|---|---|---|---|
| 3,018,272 | 1/1962 | Griffing et al. | 528/173 |
| 3,663,508 | 5/1972 | Mobius et al. | 528/173 |
| 4,299,756 | 11/1981 | Calundann | 528/173 |
| 4,515,937 | 5/1985 | Baron et al. | 528/173 |
| 4,522,974 | 6/1985 | Calundann et al. | 528/173 |

*Primary Examiner*—Lester L. Lee
*Attorney, Agent, or Firm*—Connolly and Hutz

[57] ABSTRACT

Thermotropic fully-aromatic polyesters which contain sulphonic acid and/or metal sulphonate groups bound to the aromatic rings of the polyester, have improved mechanical properties.

7 Claims, No Drawings

THERMOTROPIC, AROMATIC POLYESTERS HAVING GOOD MECHANICAL STRENGTH, CONTAINING SULFONIC ACID GROUPS OR METAL SULFONATE GROUPS A PROCESS FOR THE PRODUCTION THEREOF

The present invention relates to high molecular weight thermotropic fully-aromatic polyesters having high stiffness and favourable melt viscosity, to a process for the production thereof and to the use thereof for the production of mouldings, filaments, fibres and films.

Materials which form liquid-crystalline melts are designated as being "thermotropic". Thermotropic polycondensates are sufficiently known: c.f., by way of example, W. J. Jackson and H. F. Kuhfuss, J. Polymer Science, Polymer Chem. Ed. 14, 2402 (1976);

F. E. McFarlane et al., Liquid Crystal Polymers II, Contemporary Topics in Polymer Science, Vol. 2, Plenum Publishing Corporation, 1977;

W. C. Wooten et al., in A. Ciferri "Ultra-high Modulus Polymers", Applied Science Publ., London 1979, P. 362 f.;

A. Blumstein et al., "Liquid Crystalline Order in Polymers", Academic Press 1978;

J. Preston, Angew, Makromol. Chem. 109/110, P. 1-19 (1982);

A. Ciferri, W. R. Kriegbaum, R. B. Meyer "Polymer Liquid Crystals", Academic Press, New York, 1982;

EP No. 1185, 1340, 8855, 11 640, 15 856, 17 310, 18 145, 18 709, 22 344, 44 205, 49 615;

U.S. Pat. Nos. 3,991,013, 3,991,014, 4,066,620, 4,067,852, 4,083,829, 4,107,143; WO No. 79/797, 79/1034, 79/1040.

The liquid-crystalline state of the polycondensate melts may be examined using a polarization microscope. For such examinations the eye-piece was provided with an attachment which contained a photodiode arranged in the focal point of the eye-piece lens. Using a measuring amplifier, connected downstream, which is provided with a control device, the measuring value was set at 100 scale divisions with the microscope switched on, the Nicol prisms positioned parallel and in the absence of a material sample. If the Nicol prisms intersected, a value of 0.01 scale divisions was obtained.

The layer thickness of the polycondensate melts which were examined was 100 μm.

The liquid-crystalline melts were examined after the control samples had melted at a temperature of from 280° to 400° C. As long as a liquid-crystalline melt is observed over this entire range or in apart thereof, the polycondensate is termed to be "thermotropic".

In order to ensure that the optical anisotrophy of the melts is to be attributed to a liquid-crystalline state and not to crystals of the polycondensate which are floating in the melt, after being measured, the melt is heated a further 30° C. above the temperature of the examination. At this temperature crystals melt open, and the optical anisotropy of the melt thereby disappears. Only if the clearing of the melt observed between Nicol prisms did not disappear despite further heating, were the polycondensates were designated as being "thermotropic". They had values above 1 scale division and in most cases values of from 3 to 90 scale divisions in the measuring arrangement. In contrast, amorphous melts, such as aromatic polycarbonates, were found to have values of less than 0.1 scale divisions.

The above-described method is particularly suitable for a rapid laboratory determination and produces unequivocal results in almost every case. However, where there is doubt it may be advisable to detect the presence of liquid-crystalline components in the melt using wide-angle X-ray defraction, as is described by G. W. Gray and P. A. Windsor, in "Plastic Crystals, Physico-Chemical Properties and Methods of Investigation", in particular in Chapter 3, John Wiley & Sons, New York, Sydney, Toronto 1974.

Thermotropic, liquid-crystalline polyesters may be processed from the melt using conventional shaping processes to produce mouldings, films and fibres which have extremely good mechanical strength.

DE-OS No. 20 25 971 relates to high molecular weight, fully-aromatic polyesters which are based on P-hydroxybenzoic acids, aromatic dicarboxylic acids (such as iso- or terephthalic acid) and diphenols (such as hydroquinone or 4,4'-dihydroxydiphenyl). On account of the components which are used, these polyesters are thermotropic and may be processed to produce, for example, mouldings having good mechanical strength. Of the polyesters in the 13 Examples of DE-OS No. 2 025 971, only one melts below 300° C. Thus, these polyesters are difficult to process.

DE-OS No. 2 721 786 relates to thermotropic, aromatic polyesters which are based on p-hydroxybenzoic acids, diphenols (such as hydroquinone) and 2,6-naphthaline dicarboxylic acid.

EP-PS No. 1340 relates to thermotropic, fully-aromatic polyesters based on p-hydroxybenzoic acid, 2,6-dihydroxynaphthaline and aromatic dicarboxylic acids.

The polyesters which are described in these patents may also be processed to produce mouldings which have good mechanical strength. The strength which is obtained is sufficient to open completely new commercial fields of use for these polyesters. However, it is desirable for many uses, to further increase the mechanical strength of mouldings without reducing the thermoplastic processability thereof.

Thus, an object of the present invention is to provide thermotropic, fully-aromatic polyesters which may be more easily processed than the polyesters in DE-OS No. 2 025 971 and which also have excellent mechanical properties.

Another object of the present invention is to provide thermotropic fully-aromatic polyesters which may be processed by thermoplastic shaping to produce mouldings which have extremely good mechanical properties.

New thermotropic, fully-aromatic polyesters should preferably be thermoplastically processible at a temperature below 370° C., preferably below 350° C. and more preferably below 330° C. Moreover, the polyesters should preferably have a bending-E-modulus of at least 8000 MPa and preferably of at least 10,000 MPa (measured according to DIN 53 457).

It has surprisingly been found that fully-aromatic polyesters, the aromatic rings of which at least partially carry sulphonic acid or metal sulphonate groups, have the desired combination of advantageous properties.

Accordingly, the present invention provides thermotropic, fully-aromatic polyesters comprising
  (a) aromatic dicarboxylic acids,
  (b) diphenols and optionally,
  (c) aromatic hydroxycarboxylic acids,
the mol ratio of radicals of co-condensed aromatic dicarboxylic acids to radicals of co-condensed diphenols being from 0.95 to 1.05 and the radicals of co-condensed aromatic hydroxycarboxylic acids amounting to up to 100, preferably from 30 to 80 and more particularly from 50 to 70 mol %, based on co-condensed radicals (a) and (c), characterised in that the polyesters contain from 0.02 to 30, preferably from 0.1 to 15 and in particular from 0.2 to 5 % by weight, based on polyester, of sulphonic acid and/or metal sulphonate groups which are bound to aromatic rings of the polyester (calculated as sulphonic acid groups).

The present invention also provides a process for the production of thermotropic, fully-aromatic polyesters which comprises reacting:

(a) aromatic dicarboxylic acids,
(b) diphenols and (optionally)
(c) aromatic hydroxycarboxylic acids and aromatic dicarboxylic acids, diphenols and/or hydroxycarboxylic acids which additionally carry from 1 to 3 sulphonic acid and/or metal sulphonate groups per molecule, or the reactive derivatives thereof in the presence of chain terminators, branching agents and catalysts at a temperature of from 160° to 370° C., optionally under reduced pressure.

In relation to the present invention, aromatic dicarboxylic acids (a) are all dicarboxylic acids, the carboxyl groups of which are directly linked to an aromatic ring.

Preferred aromatic dicarboxylic acids (a) correspond to the formula $$HOOC-A-COOH \qquad (I)$$

wherein

A represents a bivalent aromatic radical having from 6 to 24 carbon atoms, preferably having from 6 to 16 carbon atoms, both valencies forming an angle of from 45° to 180°. The bivalent aromatic radicals may be substituted by from 1 to 4 $C_1$-$C_4$-alkyl, $C_1$-$C_4$-alkoxy, phenyl, phenoxy, benzyl or halogen radicals. (preferably chlorine and bromine) and in addition to phenylene, naphthylene and biphenylene also include phenylene radicals which are bound by oxygen, sulphur, carbonyl, sulphonyl, $C_1$-$C_4$-alkylene or -alkylidene, cyclohexylene or-hexylidene or —$O(CH_2)_nO$—, where n=1-4.

Examples of preferred aromatic radicals are 1,4-phenylene, 1,4-naphthylene or 4,4'-biphenylene, the two bonds extending coaxially in opposite directions, or 1,5-naphthylene, 2,6-naphthylene or 3,5'-biphenylene, the two bonds directed in opposite directions being displaced parallel to each other, and 1,3-phenylene, 1,3-, 1,6-, 1,7- or 2,7-naphthylene or 3,4'-biphenylene, the two bonds not being located at adjacent atoms and not extending coaxially, or after being displaced parallel to each other, in opposite directions.

Examples of preferred aromatic dicarboxylic acids (a) are: 1,4-naphthaline dicarboxylic acid, 1,5-naphthaline dicarboxylic acid 2,6-naphthaline dicarboxylic acid, biphenyl-4,4'-dicarboxylic acid, biphenyl-3,3'-dicarboxylic acid, diphenoxyethane-4,4'-dicarboxylic acid, diphenylether-4,4'-dicarboxylic acid, methyl terephthalic acid, methoxyterephthalic acid, chloroterephthalic acid, 4-chloronaphthaline-2,7-dicarboxylic acid, 1,3-naphthaline dicarboxylic acid, 1,6-naphthaline dicarboxylic acid, 1,7-naphthaline dicarboxylic acid, 2,7-naphthaline dicarboxylic acid, biphenyl-3,4'-dicarboxylic acid, diphenylether-3,4'-dicarboxylic acid, 4-methylisophthalic acid, 5-methylisophthalic acid and diphenylether-4,4'-dichloro-3,3'-dicarboxylic acid.

Aromatic dicarboxylic acids (a) which are particularly preferred are isophthalic and terephthalic acid.

Diphenols (b) which are preferred correspond to the formula $$HO-Z-OH \qquad (II)$$

wherein

Z represents a bivalent mono- or poly nuclear aromatic radical having from 6 to 30 carbon atoms, Z being structured such that the two OH groups are directly linked to an aromatic ring and the two valencies form an angle of from 45° to 180°. The composition of the radical Z is as defined for the aromatic radical A above.

Examples of diphenols (b) which are particularly preferred are: hydroquinone, 4,4'-dihydroxydiphenyl, 4,4'-dihydroxydiphenylether, 4,4'-dihydroxydiphenylethane, 4,4'-dihydroxydiphenoxyethane, 3,5'-dihydroxydiphenyl, 3,5'-dihydroxydiphenylether, 1,5-dihydroxynaphthaline, 2,6-dihyxroxynaphthaline, 1,4-dihydroxynaphthaline, chlorohydroquinone , bromohydroquinone , methylhydroquinone, phenylhydroquinone , ethylhydro quinone, 2,2'-dimethyl-4,4'-dihydroxydiphenyl, 3,3',5,5'-tetramethyl-4,4'-dihydroxydiphenyl, 3,5'-dimethoxy-4,4'-dihydroxydiphenylether, 1,2-(2-chloro-4-hydroxyphenoxy)ethane, 4-methoxy-2,6-dihydroxynaphthaline, resorcinol, 3,4'-dihydroxydiphenyl, 3,4'-dihydroxydiphenylether, 3,4-dihydroxydiphenoxyethane, 1,3-dihydroxynaphthaline, 1,6-dihydroxynaphthaline, 1,7-dihydroxynaphthaline, 2,7-dihydroxynaphthaline, 4-chloro resorcinol, 4-bromo resorcinol, 4-methyl resorcinol, 4-phenyl resorcinol, 4-ethoxy resorcinol, 2,5-dichloro-1,6-dihydroxynaphthaline and 4-methoxy-2,7-dihydroxynaphthaline.

Diphenols (b) which are most particularly preferred are hydroquinone , resorcinol and 4,4'-dihydroxydiphenyl.

Examples of aromatic hydroxycarboxylic acids (c) which are preferred are compounds corresponding to the formulae

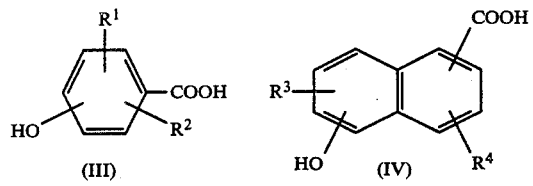

wherein $R^1$ to $R^4$ represents $C_1$-$C_4$-alkyl, $C_1$-$C_4$-alkoxy, $C_6$-$C_{10}$-aryl or -aryloxy, $C_7$-$C_{12}$-alkylaryl (preferably benzyl), halogen (preferably chlorine and bromine) or hydrogen and the valencies between the hydroxyl group and the carboxyl group both linked directly to the aromatic ring form an angle of from 45° to 180°.

Examples of aromatic hydroxycarboxylic acids (c) which are particularly preferred are: 4-hydroxy-3-methylbenzoic acid, 4-hydroxy-3-phenylbenzoic acid, 4-hydroxy-2-ethylbenzoic acid, 3-chloro-4-hydroxybenzoic acid, 3-bromo-4-hydroxybenzoic acid, 4-hydroxy-3-methoxy benzoic acid, 4-methyl-3-hydroxybenzoic acid, 4-hydroxy-3-phenoxybenzoic acid, 6-hydroxy-5-chloro-2-naphthoic acid, 6-hydroxy-5-methyl-2-naphthoic acid, 6-hydroxy-5-methoxy-2-naphthoic acid and 6-hydroxy-4,7-dichloro-2-naphthoic acid.

Aromatic hydroxycarboxylic acids (c) which are most particularly preferred are unsubstituted hydroxycarboxylic acids, such as p-hydroxybenzoic acid and 6-hydroxy-2-naphthoic acid.

If the angle between the valencies nucleus/hydroxyl and nucleus/carboxyl is from 45° to 180°, according to the above definition, this excludes among others, an angle of 360°, which is the case with 8-hydroxy-1,-naphthoic acid.

In at least 40 mol % of the monomer units which are used for synthesising the polyesters according to the present invention, the chain lengthening valencies should form an angle of 180° to ensure that the polyesters according to the present invention show a thermotropic behaviour.

In principle, the sulphonic acid or metal sulphonate groups may be introduced into the polyester in two different ways, that is either by using components (a), (b) and/or (c), which contain sulphonic acid or metal sulphonate groups or by subsequently sulphonating and optionally neutralising a suitable polyester.

Thus suitable components are aromatic hydroxycarboxylic acids, aromatic dicarboxylic acids or aromatic dihydroxy compounds or the functional derivatives thereof having one or more sulphonic acid or metal sulphonate groups located on an aromatic ring.

Preferred metal sulphonate groups contain, by way of example, alkali or alkaline-earth metal ions such as sodium potassium, lithium, magnesium, calcium or copper (II), iron (II), zinc (II), ammonium or or iron (III) ions. It is possible, by way of example, to produce the polyester by simultaneously condensing a functional sodium sulphonate of the monomer type (a) to (c) and subsequently substituting the sodium ion by ion exchange with another ion, such as a calcium ion.

Examples of monomers which are preferred for introducing the sulphonic acid or metal sulphonate groups into the polyester are: 3-sulpho-4-hydroxybenzic acid, 4-sulpho-3-hydroxybenzoic acid, hydroquinone sulphonic acid, 3-sulphoisophthalic acid, sulphotereph- thalic acid, 4-sulphonaphthaline-2,7-dicarboxylic acid, 4,7-dihydroxy-2-naphthaline sulphonic acid, 4,8-dihydroxy-2,6-naphthaline disulphonic acid, 4,6-dihydroxy-2-naphthaline sulphonic acid, 3,6-dihydroxy-2-naphthaline sulphonic acid, 6,8-dihydroxy-1,3-pyrenedisulphonic acid, the sodium and potassium salts of the above sulphonic acids and the functional derivatives of the said compounds.

The polyesters according to the present invention may contain, in statistical distribution, in segments or in blocks, the co-condensed radicals of compounds (a) to (c) and the monomers which have been substituted by sulphonic acid and metal sulphonate, and aromatic monohydroxy sulphonic acids or the alkali or alkaline-earth salts thereof may be used as end groups. These end groups may, for example, be based on 3-hydroxybenzene sulphonic acid, 4-hydroxybenzene sulphonic acid, 4-hydroxy-1,3-benzene disulphonic acid, 5-hydroxynaphthaline-1-sulphonic acid or 6-hydroxy-1,3,8-pyrene trisulphonic acid.

The polyesters according to the present invention may also contain —COOH, —H, —OH, —OC$_6$H$_5$, acyloxy or radicals stemming from chain terminators as end groups. Examples of preferred chain terminators are monofunctional aromatic hydroxyl compounds, such as 4-hydroxydiphenyl, p-nonyl phenol, 4-(1,1,3,3-tetramethylbutyl)-phenol, β-naphthol and aromatic sulpho monocarboxylic acids, such as 3- and 4- sulphone benzoic acids and aromatic monocarboxylic acids, such as diphenylcarboxylic acids and naphthaline carboxylic acids. Chain terminators may be used in a quantity from 0.5 to 5 mol %, based on the sum of components (a) and (c).

Branching tri- or higher functional, preferably aromatic monomers may optionally be used in a quantity of from 0.1 to 1 mol %. based on the sum of components (a) and (c), such as phloroglucine, 1,3,5-benzene tricarboxylic acid and 3,5-dihydroxybenzoic acid.

The polyesters according to the present invention generally have an inherent viscosity of at least 0.5, preferably at least 1.0 dl/g (measured on a solution of 5 mg of polyester/ml p-chlorophenol at 45° C.). Should the polyesters be insoluble in p-chlorophenol, it is assumed that they have the given minimum viscosity; thus they conform with the present invention as long as they fulfill the parameters of the main claim.

The polyesters according to the present invention preferably have a melt viscosity of less than 1000 Pa.s, measured at a gravitational speed of $10^3 sec^{-1}$ using a nozzle having a length/diameter ratio of 20 at a temperature below 360° C. and preferably below 330° C.

The polyesters according to the present invention may be produced by various processes, such as by condensing or reacting the reactive derivatives of compounds (a) to (c), for example the esters or acid chlorides thereof, and subsequently polycondensing them.

Examples of preferred starting compounds are the aryl esters, the acyl esters and the acid chlorides thereof.

According to a preferred synthesis process, the lower acyl esters, preferably the acetates, of compounds (b) and (c) are reacted with aromatic dicarboxylic acids (a); the acyl esters may also be produced in situ.

Components (a) to (c) and the sulphonic acid or metal sulphonate-carrying monomers are incorporated into the polyester in the ratio in which they are used.

It may be appropriate to accelerate catalytically not only the condensation and transesterification reactions respectively but also the polycondensation reaction. Catalysts of this type are known, such as lewis acids and hydrohalic acids oxides, hydrides, hydroxides, halides, alcoholates, phenolates, salts of inorganic or organic acids (preferably carboxylic acid salts), complex salts or mixed salts of alkaline-earth metals, such as magnesium, calcium; of subsidiary group elements, such as vanadium, titanium, manganese, cobalt, nickel, zinc, lanthanum, cerium, zirconium or of elements from other groups in the periodic system of the elements, such as germanium, tin, lead and antimony or the alkali metals or alkaline-earth metals themselves, in particular sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, vanadyl-C$_1$–C$_8$-alkoxides, titanium alkoxides, such as titanium tetrabutylate, titanium tetrapropylate, alkoxy titanium silicates, zirconium butylate, zirconium propylate, titanium tetra phenolate, sodium phenolate, germanium dioxide, antimony trioxide, dialkyl- and diaryl tin oxide, di-butyl tin diacetate, di-butyl-dimethoxytin. Magnesium, manganese, sodium, potassium and zinc acetate are particularly preferred.

The quantity of catalyst is preferably from 0.001 to 1 and in particular from 0.01 to 0.2% by weight, based on the total weight of the monomers which are used.

The addition of catalysts may often be avoided, as the sulphonic acid or metal sulphonate substituted monomers which are used for synthesising the polyesters according to the present invention have a catalytic effect.

The polyesters according to the present invention may be produced at a temperature of from 160° to 370° C., the reaction generally beginning at a low temperature and gradually being raised during the course of the reaction. As the rate of reaction diminishes a vacuum may be applied, the pressure preferably being dropped gradually from normal pressure to about 0.1 mbars.

The resulting product may undergo subsequent solid phase condensation under reduced pressure at a temperature of from 200° to 300° C. preferably in granulate form; generally after 5 to 25 hours, the molecular weight has increased and the resulting properties of the polyester have markedly improved.

The thermotropic polyesters according to the present invention may be advantageously processed from the melt to produce injection moulded parts, filaments, fibres, and films, on account of the relatively small melt viscosity thereof, a molecular orientation being achieved by the shearing forces produced, and being to a large extent influenced by the strength of the shearing forces. Moreover, they exhibit a pronounced structural viscosity, that is, that the melt viscosity markedly drops as the shearing forces increase. Suitable processing processes are injection moulding, extrusion, pressing and melt spinning.

Mouldings having extremely good tensile strength, good strength and great dimensional stability may be produced from the polyesters according to the present invention. As the polyesters are extremely resistant to chemicals and have excellent flame-resistance, they are particularly suitable for the production of electronic articles, such as insulators, moulded circuits, plug contacts, fittings, parts of commercial chemical apparatus, such as pipes, container linings, rotors, slide bearings, sealants, parts of aircraft interiors, parts of medical/technical apparatus, such as parts of air conditioning equipment, ventilator parts.

The polyesters, according to the present invention may, however, also be used as covering and coating material (in powder form or dispersed). They are particularly suitable for the production of reinforced or filled mouldings having a content of reinforcer or filler of from 5 to 65% by weight, based on reinforced or filled moulding composition.

EXAMPLE

The impact strength $a_n$ and the notched impact strength $a_k$ is tested on standard small rods in accordance with DIN 53 453 (ISO/R 179) at 23° C., in each case on ten testing bodies. The tensile strength is determined on standard small rods in accordance with DIN 53 452 (ISO/R 178). The bending-E modulus is determined in accordance with DIN 53 457. The dimensional stability under heat is measured by determining the Vicat-B-softening temperature in accordance with DIN 53 460 (ISO 306).

Comparison 1

The following materials are weighed in a 1 l surface-ground container having a surface-ground lid, a stirrer, a nitrogen inlet and a distillation attachment part, which is connected to a cooler:

2,4 mols ≙ 331,49 g p-hydroxy-benzoic acid
1,44 mols ≙ 239,23 g isophthalic acid
1,44 mols ≙ 158,56 g hydroquionone
6,33 mols ≙ 646,23 g acetanhydride
0.1 g magnesium acetate and
0.15 g antimony trioxide.

Under a nitrogen atmosphere, the mixture is heated to 170° C. using a salt bath. As soon as the distillation of acetic acids subsides (after about 45 minutes), the temperature in the reaction vessel is raised to 250° C. over a period of an hour and to 330° C. over a period of a further hour. When distillation is complete, the pressure is dropped to about 1 mbar over a period of 30 minutes.

During this vacuum phase the viscosity of the resultant polymer melt markedly increases. The melt is then stirred more slowly.

At the end of this phase a total quantity of 709 g of acetic acid is collected (contains residual acetanhydride.)

The resulting light brown polyester is crushed and undergoes subsequent solid phase condensation at 250° C. (about 1 mbar/24 hours). The inherent viscosity of the polyester produced in this manner is 1.2 dl/g.

EXAMPLE 1

The following materials are filled into the reaction apparatus described in Comparison 1:

2,4 mols ≙ 331,40 g hydroxybenzoic acid
1,44 mols ≙ 239,23 g isophthalic acid
1,2 mols ≙ 132,13 g hydroquinone
0,24 mols ≙ 54,72 g hydroquinone sulphonic acid-K-salt and
6,33 mols ≙ 646,23 g acetanhydride.
(no catalyst)

A light beige polyester is obtained according to the temperature-time programme given in Comparison 1, which is crushed and subsequently condensed in the solid phase at 250° C. (24 hours/about 1 mbar).

The inherent viscosity of the polyester produced in this manner is 0.715 dl/g. An optically anisotropic melt phase is observed in the range of from 320° C. to 400° C.

Comparison 2

The following materials are filled into the reaction vessel described in Comparison 1:

2,4 mols ≙ 331,49 g p-hydroxybenzoic acid,
1,44 mols ≙ 239,23 g isophthalic acid,
1 mol ≙ 110,11 g hydroquinone,
0,44 mols ≙ 81,93 g 4,4'-dihydroxydiphenyl,
6,3 mols ≙ 643,17 g acetanhydride
0.5 g magnesium acetate and
0.5 g antimony trioxide.

A very light-coloured polyester is obtained according to the temperature-time progranne given in Comparison 1, which is crushed and subsequently condensed in the solid phase at 250° C. (24 hours/about 1 mbar).

The inherent viscosity of the polyester is 0.905 dl/g. An optically anisotropic melt phase is observed in the range of from 280° to 400° C.

EXAMPLE 2

The following materials are filled into the reaction vessel described in comparison 1:

2,4 mols ≙ 331,49 g p-hydroxybenzoic acid,
1,44 mols ≙ 239,23 g isophthalic acid,
1 mol ≙ 110,11 g hydroquinone,
0,1 mols ≙ 18,62 g 4,4'-dihydroxydiphenyl, 0,34 mols ≙ 77,52 g hydroquinone sulphonic acid-K-salt and
6,3 mols ≙ 643,17 g acetanhydride.
(no catalyst)

The temperature-time programme described in Comparison 1 is adhered to. A light-beige product is obtained. The product is crushed and subsequently condensed in the solid phase at 250° C. (about 1 mbar/30 hours).

The inherent viscosity of the polyester obtained in this manner is 0.743 dl/g. An optically anisotropic melt phase is observed in the range of from 320° C. to 400° C.

EXAMPLE 3

A polyester having the following composition is produced in the reaction apparatus described in Comparison 1 according to the process described therein:

2,4 mols ≙ 331,49 g p-hydroxybenzoic acid
1,44 mols ≙ 239,23 g isophthalic acid
1 mol ≙ 110,11 g hydroquinone,,
0,34 mols ≙ 63,31 g dihydroxydiphenyl and
0.1 mols ≙ 22,8 g hydroquinone sulphonic acid-K-salt.

The resulting beige product is subsequently condensed in the fixed pahase at 250° C. (about 1 mbar/24 hours).

The inherent viscosity of the polyester is 1.086 dl/g. An optically anisotropic melt phase is observed in the range of from 280° C. to 400° C.

Comparison 3

The following materials are filled into the reaction vessel described in Comparison 1:

2,4 mols ≙ 331,49 g p-hydroxybenzoic acid,
1,2 mols ≙ 199,36 9 terephthalic acid
1,2 mols ≙ 202,34 g dihydroxynaphthaline,
5,76 mols ≙ 588, 0 g acetanhydride
0.5 g magnesium acetate,
0.5 g antimony trioxide A greyish-brown polyester is obtained according to the temperature-time programme given in Comparison 1, which polyester is crushed and subsequently condensed in the solid phase at 250° C. (20 hours/about 1 mbar). The polyester which is thus produced is insoluble in p-chlorophenol. An optically anisotropic melt phase is observed in the range of from 290° to 400° C.

EXAMPLE 4

A polyester having the following composition is produced in the reaction apparatus described in Comparison 1 and according to the process described therein:

2,4 Mol ≙ 331,49 g p-hydroxybenzoic acid,
1,2 Mol ≙ 199,36 g terephthalic acid,
1 Mol ≙ 168,61 g 2,6 dihydroxynaphthaline,
- 0.2 Mol ≙ 45, 6 g hydroquinone sulphonic acid-K-salt
5.76 Mol ≙ 588, 0 g acetanhydride,
0.5 g sodium acetate.

After subsequent condensation in the fixed phase (250° C./24 hours/about 1 mbar), a light brown product is obtained which is insoluble in p-chlorophenol. An optically anisotropic melt phase is observed in the range of from 250° to 400° C.

Standard small rods were produced from the polyesters of the Comparative Examples 1 to 3 and Examples 1 to 4 by injection moulding to test the mechanical properties thereof.

The polyesters are processed at a temperature from 300° to 330° C. The values which were measured are compiled in the following Table.

TABLE

| Example | Vicat B [°C.] | $a_n/a_k$ [KJ/m$^2$] | Tensile strength [MPa] | Bending-E-modulus [MPa] |
|---|---|---|---|---|
| Comparison 1 | 140 | 8/6 | 150 | 6500 |
| 1 | 160 | 7/2 | 144 | 10370 |
| Comparison 2 | 128 | 36/32 | 132 | 5310 |
| 2 | 132 | 7/6 | 155 | 11112 |
| 3 | 127 | 51/41 | 144 | 7418 |
| Comparison 3 | 162 | 13/10 | 157 | 10448 |
| 4 | 159 | 13/10 | 195 | 13510 |

We claim:

1. A Thermotropic fully-aromatic polyester comprising co-condensed units of
(a) aromatic dicarboxylic acids,
(b) diphenols and
(c) aromatic hydroxycarboxylic acids the mol ratio of radicals of co-condensed aromatic dicarboxylic acids to radicals of co-condensed diphenols being from 0.95 to 1.05 and the radicals of co-condensed aromatic hydroxycarboxylic acids amounting to up to 100 mol %, based on co-condensed radicals (a)+(c), characterised in that the polyesters contain from 0.02 to 30% by weight, based on polyester, of sulphonic acid and/or metal sulphonate groups, (calculated as sulphonic acid groups) which are bound to aromatic rings of the polyester.

2. A polyester according to claim 1, characterised in that it contains from 30 to 80 mol %, based on co-condensed radicals (a)+(c), of a radical of co-condensed aromatic hydroxycarboxylic acids.

3. A polyester according to claim 1 or 2, characterised in that it contains from 50 to 70 mol %, based on co-condensed radicals (a)+(c), of radicals of co-condensed radicals hydroxycarboxylic acids.

4. A polyester according to claim 1 or 2, characterised in that it contains from 0.1 to 15% by weight, based on the polyester, of sulphonic acid and/or metal sulphonate groups which are bound to aromatic rings of the polyester.

5. A polyester according to claim 1 or 2 characterised in that it contains from 0.2 to 5% by weight, based on the polyester, of sulphonic acid and/or metal sulphonate groups which are bound to the aromatic rings of the polyester.

6. A polyester according to claims 1 or 2 in the form of mouldings, filaments, fibres and films.

7. A process for the production of thermotropic, fully-aromatic polyesters which comprises reacting
(a) aromatic dicarboxylic acids, or a mixture thereof with aromatic hydroxycarboxylic acids, and
(b) diphenols wherein at least one of said aromatic dicarboxylic acids, diphenols or hydroxycarboxylic acids is substituted by from 1 to 3 sulphonic acid, metal sulphonate groups or both per molecule, in the presence of catalysts at a temperature of from 160° to 370° C.

* * * * *